Aug. 25, 1925.
H. SAIMA
1,551,518
CONTROL SYSTEM AND APPARATUS FOR ELECTRIC MACHINES
Filed March 6, 1924
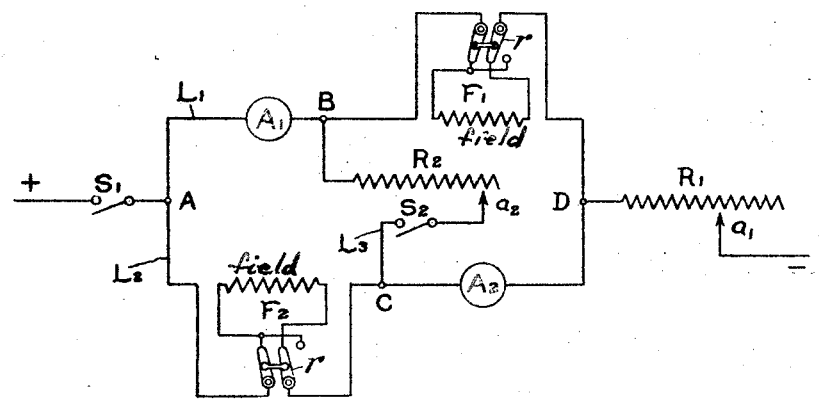
Inventor:
Hitosi Saima,
by Alexander S. _____
His Attorney.

Patented Aug. 25, 1925.

1,551,518

UNITED STATES PATENT OFFICE.

HITOSI SAIMA, OF YOKOHAMA, JAPAN, ASSIGNOR TO GENERAL ELECTRIC COMPANY, A CORPORATION OF NEW YORK.

CONTROL SYSTEM AND APPARATUS FOR ELECTRIC MACHINES.

Application filed March 6, 1924. Serial No. 697,401.

*To all whom it may concern:*

Be it known that I, HITOSI SAIMA, a subject of the Empire of Japan, residing at Yokohama, Japan, have invented certain new and useful Improvements in Control Systems and Apparatus for Electric Machines, of which the following is a specification.

My invention relates to control system and apparatus for electric machines, especially to control system and apparatus for direct current motors.

The object of my invention is to provide a control system and apparatus which is reliable in operation and suitable for hoisting or railway motor control.

According to my invention a pair of series wound electric motors are connected in parallel circuits to a suitable source with their armatures and field windings connected in reverse order and electrical connections are provided for bridging the parallel motor circuits at the points between the armature and the field winding of each motor in order to insure that the motors equalize the load, as well as run within a safe maximum speed limit.

The accompanying drawing is a simple diagram of a motor control system which has been provided for explaining the principle of the invention.

Referring to the drawing, $A_1$ and $A_2$ indicate the armatures of direct current series motors which are arranged for driving a common shaft or load, and $F_1$, $F_2$ are their field windings respectively. The motors are inserted in the parallel circuits $L_1$ and $L_2$. The armatures and field windings of these motors are arranged in reverse order in each of the parallel circuits $L_1$ and $L_2$ as shown in the drawing. A controlling circuit $L_3$ is provided by connecting the two points indicated at B and C between the respective armatures and field windings in each of the parallel circuits. $R_2$ represents an adjustable resistance inserted in the circuit $L_3$, and $S_2$ represents a switch for controlling the said circuit. $R_1$ represents a main adjustable resistance inserted in the main circuit to control the speed of the motors and $S_1$ represents the main switch which controls the main circuit. $r$ indicates reversing switches which control the polarities of the field windings.

As thus constructed and arranged, the operation of my invention as applied to controlling a crane or hoisting apparatus is as follows: To lower the load the machines may be first started as motors in the lowering direction with proper values of resistances $R_1$ and $R_2$ in the circuit and the switches $S_1$ and $S_2$ closed. The resistances of armatures $A_1$ $A_2$ and field windings $F_1$ $F_2$ being small as compared with the resistor $R_2$, current will be distributed to these motors approximately equal as in the case when these two motors were connected to the source in parallel relation with merely a series resistance $R_1$. Current will substantially take the following two parallel paths, A—B—D and A—C—D. The motors will thus start as series motors with considerable starting torque even at a light load. As the speed of the descending load increases, the current passing through the circuits A—B—D and A—C—D decreases. However, the current exciting both field windings through the circuit A—C—$S_2$—$R_2$—B—D will not decrease but remains at a considerable value as compared with the armature currents, so that the motors are given compound characteristics. As the motors further speed up due to the overruning load, and when the induced electromotive forces become greater than the applied voltage, a generated current passes through the circuits $A_1$—A—C—$S_2$—$R_2$—B and $A_2$—C—$S_2$—$R_2$—B—D and excite these two machines mutually. This dynamic action will keep the speeds of the motors within a predetermined safe limit without causing any unbalance of load on these motors.

Thus it will be seen that the apparatus according to my invention has the advantage that the load may be equally divided between the machines without any unbalance, that the machines will operate quickly at the beginning of lowering a very light load, since the motors are started as series motors and have a considerable starting torque, and that the speeds of the motors may be limited to a predetermined value irrespective of the amount of load, since the motors are provided with a compound characteristic.

The speed of the motors can be controlled by regulating the amount of resistance $R_1$ and $R_2$.

With the main switch $S_1$ closed and the switch $S_2$ opened, the motors will operate as plain series motors.

As thus described, my invention provides a safe and reliable control of a pair of motors especially for hoisting operation, but it will be readily understood by those skilled in the art that my invention is also applicable to the control of several pairs of motors which are inserted in the parallel circuits from the source with their respective armature and field winding connected in reverse order to each other.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with a pair of series wound electric motors connected in parallel circuits from a source of supply with the respective armature and field windings in reverse order, of switch mechanism for reversing the connections of the field windings of said motors, a variable resistance connected in a bridging circuit between the armature and field winding of said motors, and a switch for opening and closing said circuit.

2. A control system for a pair of electric motors, each having an armature and a field winding, comprising a plurality of regulating resistances, and electrical connections whereby one of the said resistances is connected to each motor between the armature and field winding thereof and the motors are connected with their respective armature and field windings in reverse order in parallel circuits which are in series with another of the said resistances and a source of supply.

In witness whereof, I have hereunto set my hand this 30th day of Jan., 1924.

H. SAIMA.

Henry, 708,962, Class 172-179.